US005769917A

United States Patent [19]

Belko et al.

[11] Patent Number: 5,769,917
[45] Date of Patent: Jun. 23, 1998

[54] PROCESS FOR PRODUCING LOW SHRINK CERAMIC BODIES

[76] Inventors: William C. Belko, 332 La Veta Ave., Encinitas, Calif. 92024; Randall C. Ragan, Box 951, Rancho Santa Fe, Calif. 92067

[21] Appl. No.: 762,340

[22] Filed: Dec. 9, 1996

[51] Int. Cl.⁶ .......................... C03B 19/01; C03B 19/09; D01F 9/00; D01F 6/14
[52] U.S. Cl. .......................... 65/17.3; 264/656; 264/657; 264/660; 501/32
[58] Field of Search .............................. 65/17.3; 264/656, 264/657, 660; 501/32

[56] References Cited

U.S. PATENT DOCUMENTS

| | | | |
|---|---|---|---|
| 4,265,669 | 5/1981 | Starling et al. | 106/73.4 |
| 4,689,197 | 8/1987 | Groll et al. | 419/23 |
| 4,783,297 | 11/1988 | Ito et al. | 264/63 |
| 4,957,554 | 9/1990 | Mathers et al. | 106/35 |
| 5,028,569 | 7/1991 | Cihon | 264/660 |
| 5,290,332 | 3/1994 | Chatterjee et al. | 65/18.1 |
| 5,358,913 | 10/1994 | Chatterjee et al. | 501/103 |
| 5,518,969 | 5/1996 | Ragan | 501/32 |

*Primary Examiner*—Peter Chin
*Assistant Examiner*—Jacqueline A. Ruller
*Attorney, Agent, or Firm*—Arnold Grant

[57] ABSTRACT

The disclosed invention is a ceramic composition and a process for forming thin tapes and bodies with minimal and controllable firing-induced shrinkage. The composition comprises a refractory component, a glass component and may also include a metal component. The glass component should have no more than about five percent of particles less than 10 microns. The glass component is not milled with the refractory component. They are briefly blended, e.g., by high shear mixing, in a manner which will preserve the particle size and particle size distribution of the glass. The resultant mixture is cast into a sheet or tape, with minimal or no pressure, dried and fired.

8 Claims, No Drawings

5,769,917

PROCESS FOR PRODUCING LOW SHRINK CERAMIC BODIES

FIELD OF THE INVENTION

The present invention relates to a method of forming ceramic bodies which do not change their size or shape after firing. More particularly, the present invention relates to a specific ceramic composition comprising a refractory powdered ceramic and glass particles with a minimum size of greater than 10 microns. Also more particularly, the present invention relates to a casting process for forming ceramic bodies from such composition which will shrink less than about two percent, preferably less than one-half of one percent (0.5%) in going from the unfired "green" state to the fired state.

BACKGROUND

Throughout the world, ceramics are considered to be one of the most important materials for the 21st century. This expectation is the product of many factors: Ceramics play an important role in industries which require predetermined and determinable performance in chemical stability, optical qualities and electromagnetic properties such as electronics, computers and information technology, biotechnology and medical electronics. Equally as important, the excellent qualities of ceramics, will help existing industries improve the quality of their products. Finally, the raw material for ceramics are in abundant supply. As such, ceramics can enhance the nation's economic security by taking the place of scarce metals and other materials.

One of the problems standing in the way of greater use and application of ceramics is shrinkage, particularly the unpredictability of shrinkage from ceramic bodies in going from the unfired to the fired state. Conventional ceramic products are generally formed by either the "green tape", "cold press" or "extrusion" processes from pastes, powders or slurries of refractory materials such as alumina mixed together with glass particles and organic solvents, solutes and binders. The organics are volatized at substantially lower temperatures than the firing or processing temperatures of the ceramic bodies or substrates. Solvents typically evaporate at temperatures below about 100 degrees C. and solutes evaporate at temperatures below about 450 degrees C. The loss of the organic material leaves pores in the green tape, cold pressed or extruded body. At the peak firing temperature the glass particles melt, a certain amount of sintering of the refractory material occurs and there is a resultant filling of the pores or densification of the tape or body. It is this densification which plays a role in the shrinkage.

Investigation has also shown that shrinkage can be the result of other factors, such as mechanically and chemically combined water being driven off and/or by evolution of gasses due to dissociation of raw materials, and/or by formations of gasses and/or crystalline phases of higher specific gravity. The degree of shrinkage can also be affected by the chemical composition, particle size, particle size distribution and particle shape of the raw materials, by the firing profile and ignition losses and by the methods and processes used for forming the body. It is clearly a complex problem with many variables affecting the outcome.

Equally as troublesome to workers in the field as the absolute amount of shrinkage is the extreme difficulty involved in predicting, with any degree of certainty, what the actual shrinkage will be for a given lot of bodies or a single piece. For example, average shrinkage for a given composition and firing profile may be a certain percentage. However, it is just that, an average and actual shrinkage from lot to lot or piece to piece may vary by as much as plus or minus one or two or three or more percent from that average. Clearly, this is unacceptable when the design tolerances between two parts require a greater degree of precision.

Shrinkage, per se, and lack of predictability of shrinkage, presents particular difficulties in the electronics industry where layers of "green" ceramic containing preset horizontal and vertical pathways called "vias" are stacked together and then fired. If the conductive pathways do not match up in the fired state as they did in the green state because of differing shrinkage rates between one or more layers, the resultant part either has to be reworked or scrapped. This adds unnecessary time and expense to the manufacturing process.

There have been several efforts to control or eliminate shrinkage. Examples include pre-igniting and calcining the raw materials, reducing the content of void causing volatiles, increasing forming pressure, controlling particle morphology, mechanically constraining the part to restrict shrinkage in the X-Y plane and limiting it to the vertical plane, and by formulating with materials that form crystal phases which are larger than their precursors. Each of these approaches has had varying degrees of success. However, no one of these methods has been able to consistently reduce firing induced shrinkage to less than about two percent.

It has recently been determined by Ragan, U.S. Pat. No. 5,518,969, that the combination of (a) eliminating glass "fines", i.e. particles less than about 10 microns, from the ceramic mixture, and (b) high pressure compaction of the green body prior to firing, i.e., 5,000 to 200,000 psi, will reduce shrinkage to less than two percent. However, the step of high pressure compaction of the green body adds a level of complexity and expense to the manufacturing process. Equally as important, high pressure compaction has significant problems for forming very thin sheets, less than 0.004 inches, because the high pressure on the very thin body tends to crush the fragile glass, resulting in a mixture containing greater than five percent of minus 10 micron particles.

There thus exists the need for a process that can form ceramic bodies with minimal shrinkage from the unfired to the fired state. Equally as important there exists a need for ceramic compositions where the shrinkage of the body from lot to lot and piece to piece is also predictable and substantially the same. Most importantly, there exists a need for a simple and economic process for forming thin ceramic bodies, i.e., less than about 0.004 inches, that will shrink less than two percent while being fired.

DESCRIPTION OF PRIOR ART

U.S. Pat. No. 5,518,969 (Ragan) teaches a ceramic composition consisting of a refractory material and a glass having a particle size in the range of greater than 10 microns and less than about 100 microns. It obtains shrinkage of less than two percent in going from the green to the fired state with such compositions by a process consisting of forming a green body, compacting the green body at pressures from about 5,000 to 200,000 psi and then firing. Ragan explains that the high pressure is required to allow the glass particles to fit within and fill the interstices between the particles of refractory materials.

U.S. Pat. No. 5,102,720 (Raj) teaches an unfired substrate assembly comprised of at least one layer of predominantly glass particles and at least one layer of predominantly ceramic materials. Raj further teaches at least one or both of such layers being printed with a metal conductive pattern. The preferred particle size for the glass constituent is 1 to 20 microns.

U.S. Pat. No. 4,906,596 (Jostin et al) is directed to a composition for bonding integrated circuits to inorganic dielectric substrates. The composition contains a thermally conductive metal or metal compound, milled glass frit and a surfactant. The preferred method of preparing the glass frit is to mill it from 416 hours and then screen out particles greater than 100 mesh. The result is a majority of the particles are less than 10 microns.

U.S. Pat. No. 4,883,778 (SinghDoe et al) describes a ceramic-metal glass composition which can be formed into complex engineering shapes. There is no discussion of the particle size or particle size distribution of the glass. However, the suggested size for the ceramic is in excess of about 1 micron, preferably between 1 to about 200 microns. Similarly, the suggested particle size for the metal constituent is from about 0.01 to about 50 microns. It can be presumed, therefore, that the size of the glass particles is unimportant and would be in the same range as the ceramic and metal components. The process forming the engineering shape includes hot pressing at pressures ranging from about 500 psi to about 300,000 psi.

U.S. Pat. No. 4,867,935 (Morrison) teaches a process for preparing dielectric sheets. The process comprises mixing milled glass powder with hollow ceramic microspheres, deaerating the resultant slip and casting it into a thin layer sheet. The sheet is then dried and fired. The glass is used in the form of a fine powder, with average particle size being in the range of 0.3 to 50 microns, preferably 1 to 20 microns and most preferably 1 to 5 microns.

U.S. Pat. No. 4,748,136 (Mahulikar et al) is directed to a glass-ceramic-metal composition. While the specification states that glass particles in the range of 1 to 200 microns are suitable, the only example defines the size of 40% of the glass as 325 mesh. It also teaches cold compaction of the green body at 50,000 psi followed by hot pressing at 25,000 psi and 470 degrees C.

U.S. Pat. No. 4,289,718 (McIntosh et al) defines a ceramic-glass-composition. There is no discussion of the particle size of the glass nor is there any recognition of the importance of the particle size distribution.

SUMMARY

The present invention solves each of the problems of the prior art by providing a ceramic composition and a process for forming thin tapes and bodies, i.e., less than about 0.004 inches, from that composition with a minimal and controllable amount of fire induced shrinkage. The compositions of the present invention comprise one or more refractories and one or more glasses which have a melting point below the softening point of the selected refractory material. The refractory and glass materials are each in powdered form with the glass being coarse relative to the refractory. The particle size and particle size distribution of the glass is an important feature of the present invention. The glass powder should have no more than about five percent of the particles less than 10 microns. The process of the present invention mills the refractory material with a suitable binder to obtain a uniform and intimate mixture before introducing the glass particles. The glass particles are not milled with the refractory material; instead the glass particles and refractory material are briefly blended in a manner which will preserve the integrity of the particle size and particle size distribution of the glass. High shear mixing is preferred. The resultant mixture or slip is then cast into a sheet, tape, or other desired form. The cast should be done with minimal or substantially no pressure, i.e., not enough pressure to degrade the integrity of the glass particles below about 10 microns. The sheet, tape or other form is then dried and finally fired. It has been surprisingly and unexpectedly found that when the foregoing compositions are processed in this manner they will have shrinkages, in going from the green, unfired state to the fired state, of less than about two percent. While the exact mechanism is not fully understood it is believed that when the mixture, is fired the glass particles melt and wick into the voids or interstices between the refractory materials and fill them. The glass filling provides structural integrity and prevents shrinkage.

DETAILED DESCRIPTION

It has been found that mixtures of one or more low temperature glasses and one or more refractory materials can be made to exhibit predictable shrinkages of less than about two percent and approaching zero percent. Any refractory material will work; the choice of refractory material or materials is based primarily on the physical, electrical and/or other properties desired in the resultant ceramic. E.g., strength, dielectric constant, thermal expansion, hermeticity, thermal conductivity and performance at various frequencies, etc. The preferred refractories are those which can be fired in an oxidizing atmosphere. Suitable examples include alumina, zirconia, magnesia, calcium silicate, cordierite, steatite, mullite, silica, forsterite, and mixtures thereof. The most preferred refractories are alumina, silica, forsterite, and mixtures of alumina and forsterite.

The refractory material should be in powdered form, i.e., less than about 20 microns. The preferred size range is from about 0.1 to about 1.0 microns.

Any glass will work; as with the refractory material, the glass is also selected for its physical, electrical and/or other properties. There are, however, four specific requirements: First and foremost there must be substantially no, i.e., less than about five percent, glass particles having a size of less than 10 microns. Preferably, all glass particles of less than 10 microns have been removed. Second, the glass or glass particles must have a coefficient of thermal expansion equal to or less than that of the refractory. Third, the glass or glasses must have a melting point below the softening point of the refractory material. Finally, the particles of glass or glasses must at least partially wet, i.e., adhere to, and spread across, immediately adjacent particles of the refractory material when the mixture is fired. This latter requirement aids in the bonding of the glass particles to the refractory particles and thus the refractory particles to each other. As will be explained in greater detail below, the combination of these requirements provides the structural integrity and extremely low shrinkage.

Examples of suitable glass include lead silicate, lead borosilicate, soda-lime glass and mixtures thereof. The preferred glasses include borosilicate and barium borosilicate.

The glass should also be in powder form. As mentioned above, however, the particle size and distribution of the glass must be strictly controlled and there should be less than about five percent and preferably no particles having a size of less than 10 microns. Studies have shown that there is a dramatic increase in shrinkage in the X-Y plane when there is more than about five percent of glass particles smaller than 10 microns present in the ceramic composition. Preferred particle sizes are from about 10 to 100 microns. The most preferred particles sizes are from about 10 to about 50 microns because of the desirable surface characteristics for glass particles within this range. I.e., the larger the particle size the coarser is the particle and relatively smooth particles are preferred.

As stated, the melting point of the glass or mixture of glasses, should be less than the softening point of the refractory material or materials. Based on the above examples for refractory materials this would be a range from about 400 degrees C. to about 1000 degrees C., preferably from about 700 degrees C. to about 1000 degrees C. and most preferably from about 800 degrees C. to about 950 degrees C.

The relative amounts of glass and refractory in the mixture are also largely dependent on the physical, electrical and/or other properties desired in the resultant ceramic. In those ceramics where hermeticity is a consideration the amount of glass should be adjusted to produce zero absorption or hermeticity. When hermeticity is not a problem less glass may be used. A useful set of properties will usually be found in the range from about 10 percent to about 60 percent glass, volume to volume, preferably from about 30 percent to about 50 percent glass, and from about 40 percent to about 90 percent refractory, preferably about 50 to 70 percent refractory.

The mixture also contains a binder. A binder is a mixture of resin and solvent which when mixed with a ceramic powder and dried promotes cohesion of the ceramic powder and allows sheets or shapes to be formed. Suitable examples are well know to those skilled in the art and would include thermoplastics such as vinyl acetate ethylene copolymer emulsion sold by Air Products Corporation under the name of Air Products 410, an acrylic resin dispersed in a volatile organic solvent such as methylene chloride, and polyvinyl butyral, methyl methacrylate, polyethylene glycol or ethyl hydroxyethyl cellulose disbursed in a volatile organic solvent such as methylene chloride.

It is preferred to add a plasticizer to assist in the handling and forming of the green body. Plasticizers help to lower the glass transition temperature and allow the flexibility of the material to be controlled. Examples of suitable plasticizers are well known to those skilled in the art and would include butyl-benzyl phthalate and diallyl phthalate. As those skilled in the art appreciate the amount of plasticizer used is a function of the final condition required for the green body; the more pliability required, the greater the amount of plasticizer employed.

It is also desirable to add a small amount of surfactant to aid in the dispersing of the binder and thus forming of the green body. The particular choice of surfactant and whether it is anionic, cationic or non-ionic, is not critical. Similarly, the amount of surfactant is not critical. The selection of each is well within the skill of the art. As used herein the term "binder" is intended to include the binder alone or the binder in combination with a plasticizer and/or surfactant and/or other known and useful adjuvants.

Particularly desirable electrical and thermal conductivity may be obtained for the resultant ceramic by the incorporation of a suitable metal powder as part of the refractory phase. Any conductive metal will work. For applications where the ceramic composition is classified as an insulator, such as for electronic packaging components, the metallic particles are preferably provided in a weight percent so that they are discontinuously dispersed throughout the fired composite. Preferably the metal or metal alloy particles make up less than about fifty percent of the weight of the final fired composite. More preferably less than about thirty percent of the weight. Limiting the amount of metallic particles is believed to prevent the formation of a continuous metal path in the final fired composite. Even with discontinuously dispersed metallic particles the finally fired body exhibits improved thermal conductivity as compared to a composition containing only ceramic and glass. This is surprising since there is no corresponding increase in the electrical conductivity.

Where electrical conductivity is desired the metal or metal alloy particles should make up more than about fifty percent of the weight of the final fired composite, preferably at least about fifty-five percent by weight. For example, a ceramic composition prepared according to the present invention and containing fifty-five percent by weight silver powder exhibited an electrical conductivity of less than one ohm per square. For electrical conductivity aluminum, copper, gold, silver, platinum, and palladium are preferred. Gold, silver, platinum and palladium are particularly advantageous because they may be fired in an oxidizing atmosphere without the loss of their metal characteristics. Aluminum, copper and other metals should be fired in a non-oxidizing atmosphere. The particle size for the metal powder should be in the range of 0.1 to about 6 microns, preferably from about 2 to about 5 microns.

In the process of the present invention the selected refractory material or mixture is milled together with the binder solution, plasticizer, surfactant, and if desired, metal powder to form a slip. Ball milling is a common and convenient method for aggressively mixing the ceramic powder with the binder and other adjuvants with minimal contamination and solvent loss. Milling time will vary, depending upon the size of the mill, milling media and stem used and the particular refractory material or mixture. The objective is to form a uniform and intimate mixture of the finely ground constituents in the resultant slip. The characteristics to determine the degree to which the sip should be milled include degree of agglomeration, viscosity and particle size distribution.

A simple method to determine the degree of dispersion of the refractory material in the binder and other adjuvants is what is known as "fineness of grind block". This is a device consisting of a hardened block of steel that has a calibrated tapered groove. A small amount of slip is poured into the deep end of the groove and a precision ground doctor blade is used to draw the slip up the block. As the depth of groove approaches the diameter of the suspended particles, streaks are formed in the slip. This allows the operator to measure the largest agglomerates in the slip. For purposes of the present invention it is preferred that there are no agglomerates greater than about 1 to about 9 times the average particle size, preferably 3 to about 7 times the average particle size and most preferably no agglomerates greater than about 5 times the average particle size.

The slip is then removed from the mill and added to the glass powder. Here again, the objective of the method of blending is to form an intimate and uniform mixture of the glass particles and the refractory material. However, the method of mixing the refractory and glass must assure the integrity of the glass particles so that less than five percent of the glass particles are below 10 microns. Those skilled in the art will be aware of several methods to accomplish these objectives. The preferred method is high shear mixing, such as, for example a commercial blender. The glass refractory slip, containing, if desired, metal particles, is then formed into a desired shape, such as a tape or sheet, without the use of significant pressure in the forming, and allowed to dry. The final step is to fire the green body. A suggested profile is four hours transiting room temperature to 500 degrees C., one hour in which the temperature is raised from 500 degrees C. to 900 degrees C., 30 minutes soaking at 900 degrees C. and then a gradual cool in the kiln to room temperature. Those skilled in the art will be aware of other suitable firing profiles.

EXAMPLE 1

Twenty-five grams of alumina (Alcon C90LSB) were added to a ball mill along with 15.3 grams of a ceramic binder (Ferro B73210). The mill contained ⅜ inch burundum media. Milling continued for 15 hours at approximately 70 RPM. The resultant slip was removed from the ball mill and added to a high shear Osterizer mixer along with 13.5 grams of glass (Ferro 3288 frit) containing particles in the range of 10–40 microns. The mixture was blended at low speed for three minutes. A hand drawn casting head with a 0.02 inch step was used to layer the slip onto a sheet of silicon coated Mylar. The slip was dried in an air circulating oven at 60 degrees C. until dry. A three inch square of the tape was measured and placed on a thin layer of zirconia powder on an alumina substrate and fired. The firing profile was four hours from room temperature to 500 degrees C., one hour from 500 to 900 degrees C., 30 minute soak at 900 degrees C. and cool to room temperature in the kiln. The fired dimensions were then measured.

| Pre-fire | | | Post fire | | | Shrinkage Rate | | |
|---|---|---|---|---|---|---|---|---|
| L | W | T | L | W | T | L | W | T |
| 2.993 | 2.997 | 0.058 | 2.958 | 2.963 | 0.058 | 1.17% | 1.13% | 0.00% |

EXAMPLE II

Example I was repeated with the only change being that the particle size range of the glass was from 0.1 to 40 microns. The measurements were as follows

| Pre-fire | | | Post-fire | | | Shrinkage Rate | | |
|---|---|---|---|---|---|---|---|---|
| L | W | T | L | W | T | L | W | T |
| 2.999 | 2.991 | 0.093 | 2.758 | 2.747 | 0.090 | 8.04% | 8.16% | 3.23% |

A comparison of Example I and II shows the dramatic advantages obtained with compositions of the present invention prepared according to the process of the present invention as compared with a control composition with only one difference. These advantages were obtained without the use of the pressure prior to or during the firing of the green body.

To further demonstrate the wide range of ceramics and glasses that can be utilized according to the present invention the following combinations were prepared. Each was formed into a tape of less than 0.04 inches in thickness in accordance to the present process, measured in the green state, fired and then measured again to determine shrinkage.

| Refractory | Glass | Glass Content | x, y, Average Shrinkage |
|---|---|---|---|
| Titanium oxide | soda-lime | 50% | 1.51% |
| Tin Oxide | barium borosilicate | 50% | 1.08% |
| Tin oxide | soda-lime | 50% | 1.04% |
| Zinc oxide | barium borosilicate | 50% | 1.58% |
| Zinc oxide | soda-lime | 50% | 0.87% |
| Zinc Oxide | lead borosilicate | 50% | 0.20% |
| Nickel oxide | lead borosilicate | 40% | 0.44% |
| Nickel oxide | barium borosilicate | 40% | 0.64% |

-continued

| Refractory | Glass | Glass Content | x, y, Average Shrinkage |
|---|---|---|---|
| Nickel oxide | soda-lime | 40% | 0.15% |
| Chromium oxide | lead borosilicate | 40% | 0.43% |
| Chromium oxide | barium borosilicate | 40% | 0.35% |
| Chromium oxide | soda-lime | 40% | 0.19% |
| Aluminum-nickel | soda-lime | 45% | 0.13% |
| Aluminum-nickel | barium borosilicate | 45% | 0.07% |
| Tungsten oxide | barium borosilicate | 40% | 1.77% |
| Neodymium oxide | soda-lime | 40% | 0.92% |
| Neodymium oxide | barium borosilicate | 40% | 1.01% |
| Holmium oxide | soda-lime | 40% | 0.10% |
| Holmium oxide | lead borosilicate | 40% | 0.65% |
| Europium oxide | soda-lime | 50% | 0.62% |
| Europium oxide | lead borosilicate | 50% | 1.10% |
| Cerium oxide | soda-lime | 50% | 0.60% |
| Cerium oxide | barium borosilicate | 50% | 0.43% |
| Cerium oxide | lead borosilicate | 50% | 0.08% |
| Yttrium oxide | lead borosilicate | 50% | 0.17% |
| Samarium oxide | soda-lime | 50% | 1.00% |
| Samarium oxide | barium borosilicate | 50% | 0.17% |
| Samarium oxide | lead borosilicate | 50% | 1.17% |
| Magnesium oxide | barium borosilicate | 50% | 1.12% |
| Alumina | barium borosilicate | 40% | 0.65% |
| Alumina | lead borosilicate | 40% | 0.81% |
| Calcium silicate | lead borosilicate | 52% | 0.82% |
| Calcium silicate | soda-lime | 54% | 0.25% |
| Zirconium oxide | soda-lime | 30% | 0.53% |
| Zirconium oxide | barium borosilicate | 50% | 0.50% |

There are many unique and distinct advantages from the use of ceramic compositions prepared in accordance with the present invention. For example, when forming a multi-layered electronic device each layer can be of a different composition, assuming a similar coefficient of thermal expansion, and thus having different electrical properties. Since each of the layers will have the same controlled shrinkage, there will be no delamination or distortion. Similarly, ceramic tapes prepared from ceramic compositions prepared in accordance with the present invention can be laminated to and subsequently fired into previously fired ceramic or metal layers or articles. Because there is not shrinkage, there will be no deleterious "bimetal strip" bending effect or cracking of the tape due to shrinkage during firing because the prefired ceramic does not shrink in concert. Further, other useful techniques are facilitated such as the imbedment of wires or ribbons in the green ceramic tape, or the insertion of Beryllium oxide ceramic, useful for its thermal conduction properties, into punched holes in the green ceramic tape, all of which fuse together during firing without cracking of the ceramic. Finally, the green tape can be laminated into the seam areas or vacuum formed to create articles of complex shapes and more particularly large shapes heretofore not possible, which do not crack upon firing.

As the present invention may be embodied into many forms without departing from the spirit or essential character and differing only in matters of detail, it should not be limited by the preceding description. The scope of the invention is to be determined solely by the appended claims:

We claim:

1. A process for making ceramic bodies which will shrink less than about two percent in the X-Y plane in going from a green state to a fired state consisting of the following steps:

(a) forming an intimate, uniform mixture of at least one refractory material and a binder, the refractory material having a particle size in the range of about 0.1 to about 20 microns;

(b) milling the mixture of refractory material and binder until there are no agglomerates greater than about 1 to about 9 times the average particle size of the material;

(c) selecting a glass powder having a melting point below that of the refractory material softening point, a coefficient of thermal expansion not greater than that of the refractory material and being able to adhere to and spread across immediately adjacent particles of refractory material when the mixture is fired;

(d) separating the glass powder so that there is a selected fraction wherein at least 95 percent of the glass has a particle size greater than about 10 microns and less than about 100 microns;

(e) adding a quantity of the selected fraction of the glass powder to the refractory material-binder mixture such that there is from about 40 to about 90 percent by volume of refractory material and from about 10 to about 60 percent glass;

(f) blending the glass-refractory-binder mixture under conditions that will maintain at least 95 per cent of the glass particles above a size of about 10 microns;

(g) forming the mixture into a desired ceramic body with minimal or substantially no pressure such that the integrity of the glass particles is not degraded below about 10 microns;

(h) drying the body; and, (i) firing the body at a temperature sufficient to volatize the binder and melt the glass so that glass wicks between and substantially fills the interstices of the particles of refractory material.

2. The process of claim 1 wherein the ceramic body has a thickness in the unfired state of less than about 0.004 inches.

3. The process in according to claim 1 wherein the refractory material is selected from the group consisting of alumina, zirconia, magnesia, calcium silicate, cordierite, steatite, mullite, forsterite and mixtures thereof.

4. The process according to claim 1 wherein the glass is selected from the group consisting of lead borosilicate, barium borosilicate, soda-lime, lead silicate, lead borosilicate and mixtures thereof.

5. The process according to claim 1 wherein the refractory material is present from about 50 to about 70 percent by volume and is selected from the group consisting of alumina, silica, forsterite and mixtures thereof and the glass particles are present from about 30 to about 50 percent by volume and are selected from the group consisting of lead borosilicate and barium borosilicate.

6. There process according to claim 1 wherein the glass has a particle size of from 10 to about 50 microns.

7. The process according to claim 1 wherein the mixture further comprises a metal powder having a particle size of from 0.5 to about 6 microns.

8. The process according to claim 1 wherein metal is selected from the group consisting of aluminum, copper, silver, gold, platinum and palladium.

* * * * *